US008869605B2

(12) United States Patent
Ikemoto

(10) Patent No.: US 8,869,605 B2
(45) Date of Patent: Oct. 28, 2014

(54) DEPOSIT AMOUNT ESTIMATION DEVICE OF ENGINE

(75) Inventor: Masato Ikemoto, Susono (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 182 days.

(21) Appl. No.: 13/574,118

(22) PCT Filed: Apr. 25, 2011

(86) PCT No.: PCT/JP2011/060026
§ 371 (c)(1),
(2), (4) Date: Jul. 19, 2012

(87) PCT Pub. No.: WO2012/147143
PCT Pub. Date: Nov. 1, 2012

(65) Prior Publication Data
US 2012/0318053 A1 Dec. 20, 2012

(51) Int. Cl.
G01M 15/04 (2006.01)
F02M 65/00 (2006.01)
F02D 41/22 (2006.01)

(52) U.S. Cl.
CPC ............. *F02M 65/00* (2013.01); *F02D 41/221* (2013.01); *F02D 2200/0614* (2013.01); *Y02T 10/40* (2013.01); *F01N 2900/1602* (2013.01)
USPC .................................................... 73/114.45

(58) Field of Classification Search
CPC ... F02M 65/00; F02M 65/001; F02M 65/007; F02M 65/008
USPC ................ 73/114.45, 114.46, 114.48, 114.51
See application file for complete search history.

(56) References Cited

U.S. PATENT DOCUMENTS

| 2004/0035954 | A1* | 2/2004 | Carlise et al. ................. 239/584 |
| 2008/0060259 | A1* | 3/2008 | Breakspear et al. ............ 44/327 |
| 2008/0060608 | A1* | 3/2008 | Breakspear et al. ...... 123/198 A |
| 2010/0043403 | A1* | 2/2010 | Minamikawa et al. ......... 60/285 |
| 2010/0163000 | A1  | 7/2010 | Futonagane et al. |
| 2013/0054123 | A1* | 2/2013 | Ikemoto ....................... 701/104 |

FOREIGN PATENT DOCUMENTS

| EP | 2 156 038 A1 | 2/2010 |
| JP | 2008-309081 A | 12/2008 |
| JP | 2009-257100 A | 11/2009 |
| JP | 2009-264333 A | 11/2009 |
| JP | 2010-065537 A | 3/2010 |
| WO | 2008/152488 A1 | 12/2008 |

OTHER PUBLICATIONS

International Search Report of PCT/JP2011/060026 dated Jun. 21, 2011.

* cited by examiner

*Primary Examiner* — Eric S McCall
(74) *Attorney, Agent, or Firm* — Sughrue Mion, PLLC

(57) ABSTRACT

The invention relates to a deposit amount estimation device for estimating a deposit amount by calculating an amount of a deposit on an injection hole wall face of a fuel injector (22). An increment judgment of whether an actual fuel injection amount is larger than the required fuel injection amount corresponding thereto when a fuel injection command value corresponding to a required fuel injection amount smaller than a predetermined amount is given to the fuel injector, is performed, and when it is judged that the actual fuel injection amount is larger than the required fuel injection amount corresponding thereto by the increment judgment, the deposit amount is estimated on the basis of the difference between the actual fuel injection amount and the required fuel injection amount corresponding thereto.

8 Claims, 10 Drawing Sheets

DEPOSIT AMOUNT ESTIMATION DEVICE OF ENGINE

CROSS REFERENCE TO RELATED APPLICATIONS

This application is a National Stage of International Application No. PCT/JP2011/060026 filed Apr. 25, 2011, the contents of all of which are incorporated herein by reference in their entirety.

TECHNICAL FIELD

The invention relates to a deposit amount estimation device of an engine.

BACKGROUND ART

An engine comprising fuel injectors arranged such that a fuel is injected directly into combustion chambers, is known. In such an engine, it is also known that a combustion product (i.e. a substance derived from the combustion of the fuel) deposits on an injection hole outlet adjacent wall face of the fuel injector (i.e. a fuel injector wall face adjacent to the outlet of the fuel injection hole of the fuel injector). In the case that combustion products deposit on the injection hole outlet adjacent wall face, even when a command is given to the fuel injector for making the injector inject a desired amount of fuel, the fuel of the desired amount may not be injected from the fuel injector. Further, when the fuel of the desired amount is not injected from the fuel injector, the output property and the exhaust gas property of the engine may decrease. In the fuel injection control device of the engine described in the Patent Document 1, when the amount of combustion products depositing on the injection hole outlet adjacent wall face (hereinafter, the combustion product depositing on the injection hole outlet adjacent wall face, will be referred to as—deposit—and the amount of the deposit will be referred to as—deposit amount—) is equal to or larger than the base amount, the fuel injection is controlled such that the deposit is removed from the injection hole outlet adjacent wall face.

In the fuel injection device described in the Patent Document 1, the deposit amount is used for judging if the deposit should be removed from the injection hole outlet adjacent wall face. Therefore, in the Patent Document 1, it is necessary to estimate the deposit amount. When the amount of the fuel actually injected from the fuel injector will be referred to as actual fuel injection amount, the amount of the fuel required to be injected from the fuel injector will be referred to as required fuel injection amount and the command value given to the fuel injector for making the fuel injector inject the fuel of the required fuel injection amount when the deposit amount is zero will be referred to as fuel injection command value, in the Patent Document 1, from the knowledge that the actual fuel injection amount is smaller than the required fuel injection amount when there is the deposit on the injection hole outlet adjacent wall face and the actual fuel injection amount becomes smaller than the required fuel injection amount as the deposit amount becomes large, the deposit amount is estimated on the basis of the difference between the actual and required fuel injection amounts when the actual fuel injection amount is smaller than the required fuel injection amount. In this case, it should be noted that it is estimated that the deposit amount is large as the difference between the actual and required fuel injection amounts is large.

PRIOR ART DOCUMENTS

Patent Document

[Patent Document 1] Unexamined Japanese Patent Publication No. 2009-257100

[Patent Document 2] Unexamined Japanese Patent Publication No. 2010-65537

DESCRIPTION OF THE INVENTION

In the Patent Document 2, it is described that in the case that the fuel injection pressure (i.e. the pressure of the fuel when the fuel is injected from the fuel injector) is relatively high and the fuel injection amount (i.e. the amount of the fuel injected from the fuel injector) is relatively small when there is the deposit on the injection hole outlet adjacent wall face, the actual fuel injection amount is larger than the required fuel injection amount, not smaller than the required fuel injection amount. That is, the Patent Document 2 suggests that the actual fuel injection amount may not be smaller than the required fuel injection amount, depending on the operation condition of the engine, even when there is the deposit on the injection hole outlet adjacent wall face. In this case, when the deposit amount is estimated, using the technique described in the Patent Document 1, the deposit amount may not be exactly estimated.

The object of the invention is to estimate the deposit amount exactly in the case that the actual fuel injection amount is not smaller than the required fuel injection amount when there is the deposit on the injection hole outlet adjacent wall face.

The invention of this application relates to a deposit amount estimation device of an internal combustion engine provided with a fuel injector for estimating a deposit amount by calculating a deposit amount which is an amount of the deposit on an injection hole wall face constituted by at least one of an injection hole defining wall face defining a fuel injection hole of the fuel injector, a wall face of the fuel injector adjacent to an inlet of the fuel injection hole other than the injection hole defining wall face and a wall face of the fuel injector adjacent to an outlet of the fuel injection hole other than the injection hole defining wall face. Then, when an amount of the fuel actually injected from the fuel injector is referred to as actual fuel injection amount, a required amount of the fuel injected from the fuel injector is referred to as required fuel injection amount and a command value given to the fuel injector for making the fuel injector inject the fuel of the required fuel injection amount when the deposit amount is zero is referred to as fuel injection command value, according to the invention, an increment judgment is performed for judging if the actual fuel injection amount is larger than the required fuel injection amount corresponding thereto when a fuel injection command value corresponding to the required fuel injection amount smaller than a predetermined amount is given to the fuel injector and when it is judged that the actual fuel injection amount is larger than the required fuel injection amount corresponding thereto by the increment judgment, the deposit amount is estimated on the basis of the difference between the actual fuel injection amount and the required fuel injection amount corresponding thereto.

According to the invention, in the case that the actual fuel injection amount does not become smaller than the required fuel injection amount even when there is the deposit on the injection hole wall face, the deposit amount can be exactly estimated. That is, if the required fuel injection amount is relatively large (i.e. is larger than a predetermined amount which is a suitable amount) when there is the deposit on the injection hole wall face, the actual fuel injection amount is smaller than the required fuel injection amount. However, if the required fuel injection amount is relatively small (i.e. is smaller than the predetermined amount) when there is the deposit on the injection hole wall face, the actual fuel injection amount is larger than the required fuel injection amount. Therefore, in order to exactly estimate the deposit amount, the above-explained matter should be considered. In the invention, the deposit amount is estimated, considering this matter. Therefore, according to the invention, in the case that the actual fuel injection amount is not smaller than the required fuel injection amount even when there is the deposit on the injection hole wall face, the deposit amount can be exactly estimated.

It should be noted that any fuel injector can be employed as far as it is a fuel injector where a deposit may accumulate on the injection hole wall face thereof, and for example, a type of a fuel injector wherein its tip end exposes to the interior of the combustion chamber of the engine so as to inject the fuel directly into the combustion chamber (so-called cylinder direct injection type fuel injector) or a type of a fuel injector where its tip end exposes to the interior of the intake port of the engine so as to inject the fuel into the intake port (so-called port injection type fuel injector), may be employed.

As the difference between the actual fuel injection amount and the required fuel injection amount corresponding thereto, a parameter representing the difference may be used for the estimation of the deposit amount. For example, when a fuel cut is performed for forbidding the fuel injection for making the fuel injector inject the fuel at a timing so as to produce a torque during a plurality of the operation cycles of the engine and the torque is referred to as base torque, the torque being produced in the case that the actual fuel injection amount corresponds to the required fuel injection amount when the fuel injection command value corresponding to the required fuel injection amount smaller than the predetermined amount is given to the fuel injector at a timing so as to produce a torque during the fuel cut, the difference between the base torque and the actual torque when the fuel injection command value corresponding to the required fuel injection amount smaller than the predetermined amount is given to the fuel injector at a timing so as to produce a torque during the fuel cut, may be used for the estimation of the deposit amount as the difference between the actual fuel injection amount and the required fuel injection amount corresponding thereto.

In this case, as a result, the deposit amount is estimated on the basis of the difference between the base and actual torques and the actual torque is one produced when a fuel injection is performed to inject the fuel of the required fuel injection amount smaller than the above-mentioned predetermined amount from the fuel injector during the fuel cut (hereinafter, the above-mentioned fuel injection will be referred to as—minute fuel injection—). In this regard, the amount of the fuel injected from the fuel injector by the minute fuel injection (hereinafter, this injected fuel will be referred to as—minute fuel—) is relatively small (i.e. is smaller than the above-mentioned predetermined amount) and therefore, the torque produced by the combustion of the minute fuel is small. Thus, when a torque other than that produced by the combustion of the minute fuel is produced, it is difficult to apprehend the torque produced by the combustion of the minute fuel. However, the minute fuel injection is performed during the fuel cut and then, the torque other than that produced by the combustion of the minute fuel is zero during the fuel cut. Therefore, it is easy to apprehend the torque produced by the combustion of the minute fuel. Therefore, when the deposit amount is estimated on the basis of the difference between the base and actual torques, it is possible to estimate the deposit amount accurately.

Further, for example, when the fuel cut is performed for forbidding a fuel injection for making the fuel injector inject the fuel at a timing so as to produce a torque during a plurality of the operation cycles of the engine and a torque produced in the case that the actual fuel injection amount corresponds to the required fuel injection amount when the fuel injection command value corresponding to the required fuel injection amount smaller than the above-mentioned predetermined amount is given to the fuel injector at a timing so as to produce a torque during the fuel cut, is referred to as base torque, it may be judged that the actual fuel injection amount is larger than the required fuel injection amount corresponding thereto when the fuel injection command value corresponding to the required fuel injection amount smaller than the above-mentioned predetermined amount is given to the fuel injector at a timing so as to produce a torque during the fuel cut and then, the actual torque is larger than the base torque.

In this case, as a result, it is judged if the actual fuel injection amount is larger than the required fuel injection amount corresponding thereto on the basis of the base and actual torques and the actual torque is one produced at the performance of the minute fuel injection. In this regard, the amount of the fuel (i.e. the minute fuel) injected from the fuel injector by the minute fuel injection is relatively small (i.e. is smaller than the above-mentioned predetermined amount) and therefore, the torque produced by the combustion of the minute fuel is small. Thus, when the torque other than that produced by the combustion of the minute fuel is produced, it is difficult to apprehend the torque produced by the combustion of the minute fuel. However, the minute fuel injection is performed during the fuel cut and the torque other than that produced by the combustion of the minute fuel is zero during the fuel cut. Therefore, it is easy to apprehend the torque produced by the combustion of the minute fuel. Therefore, it is possible to accurately judge if the actual fuel injection amount is larger than the required fuel injection amount corresponding thereto on the basis of the base and actual torques.

Further, for example, when the fuel cut is performed for forbidding the fuel injection for making the fuel injector inject the fuel at a timing so as to produce a torque during a plurality of the operation cycles of the engine, a torque produced in the case that the actual fuel injection amount corresponds to the required fuel injection amount when the fuel injection command value corresponding to the required fuel injection amount smaller than the above-mentioned predetermined amount is given to the fuel injector at a timing so as to produce a torque during the fuel cut, is referred to as base torque and an amendment value for amending the fuel injection command value is learned such that the actual fuel injection amount corresponds to the required fuel injection amount when the fuel injection command value corresponding to the required fuel injection amount smaller than the above-mentioned predetermined amount is given to the fuel injector on the basis of the difference between the base torque and the actual torque produced when the fuel injection command value corresponding to the required fuel injection amount smaller than the above-mentioned predetermined amount is given to the fuel injector at a timing so as to produce a torque during the fuel cut, the learned amendment value may be used for the estimation of the deposit amount as the difference between the actual fuel injection amount and the required fuel injection amount corresponding thereto.

In this case, as a result, the deposit amount is estimated on the basis of the learned amendment value and then, the amendment value is learned on the basis of the difference between the base and actual torques, and in this case, the actual torque is one produced when performing a fuel injection for making the fuel injector inject the fuel of the required fuel injection amount smaller than the above-mentioned predetermined amount (hereinafter, the above-mentioned fuel injection will be referred to as—minute fuel injection—) during the fuel cut. In this regards, the amount of the fuel injected from the fuel injector by the minute fuel injection (hereinafter, this injected fuel will be referred to as—minute fuel—) is relatively small (i.e. is smaller than the above-mentioned predetermined amount) and therefore, the torque produced by the combustion of the minute fuel is small. Therefore, when a torque other than that produced by the combustion of the minute fuel is produced, it is difficult to apprehend the torque produced by the combustion of the minute fuel. However, the minute fuel injection is performed during the fuel cut and the torque other than that produced by the combustion of the minute fuel is zero during the fuel cut. Therefore, the torque produced by the combustion of the minute fuel is easily apprehended. Therefore, when the amendment value is learned on the basis of the difference between the base and actual torques, the amendment value can be exactly learned and as a result, the deposit amount can be exactly estimated.

Further, the above-mentioned increment judgment may be performed in relation to any fuel injection as far as the increment judgment is performed on the basis of the actual fuel injection amount and the required fuel injection amount corresponding thereto, which actual fuel injection amount is one when the fuel injection command value corresponding to the required fuel injection amount smaller than the above-mentioned predetermined amount is given to the fuel injector. In this regard, when the fuel cut is performed for forbidding the fuel injection for making the fuel injector inject the fuel at a timing so as to produce a torque during a plurality of the operation cycles of the engine, a torque produced in the case that the actual fuel injection amount corresponds to the required fuel injection amount when the fuel injection command value corresponding to the required fuel injection amount smaller than the above-mentioned amount is given to the fuel injector at a timing so as to produce a torque during the fuel cut, is referred to as base torque and an amendment value for amending a fuel injection command value is learned such that the actual fuel injection amount when the fuel injection command value corresponding to the required fuel injection amount smaller than the predetermined amount is given to the fuel injector, corresponds to the required fuel injection amount on the basis of the difference between the actual torque and the base torque when the fuel injection command value corresponding to the required fuel injection amount smaller than the predetermined amount is given to the fuel injector during the fuel cut, it is preferred that the increment judgment is performed on the basis of the learned amendment value.

Further, for example, when the fuel injector is one for injecting the fuel directly into the combustion chamber of the engine and main and sub fuel injections are performed, the main fuel injection making the fuel injector inject the fuel at a timing so as to be able to produce a torque during one operation cycle of the engine and the sub fuel injection making the fuel injector inject the fuel at a timing so as not to produce a torque before the timing of carrying out the main fuel injection, the difference between the actual fuel injection amount by the sub fuel injection when a fuel injection command value corresponding to the required fuel injection amount smaller than the predetermined amount is given to the injector and the required fuel injection amount relating to the sub fuel injection at the performance of the sub fuel injection may be used for the estimation of the deposit amount as the difference between the actual fuel injection amount and the required fuel injection amount corresponding thereto.

In this case, the estimation of the deposit amount can be performed with high frequency, while the property of the engine is maintained high. That is, when the required fuel injection amount is generally larger than or equal to a predetermined amount and the fuel of the required fuel injection amount smaller than the predetermined amount for the purpose of the performance of the estimation of the deposit amount, is injected from the fuel injector, the property of the engine adversely decreases. On the other hand, if the decrease of the property of the engine is maintained to the minimum, the opportunity of the injection of the fuel of the required fuel injection amount smaller than the predetermined amount from the fuel injector decreases. In this case, the frequency of the performance of the estimation of the deposit amount decreases. However, if the estimation of the deposit amount is performed in relation to the sub fuel injection performed for the purpose other than that of the estimation of the deposit amount, it is unnecessary to forcibly make the fuel injector inject the fuel of the required fuel injection amount smaller than a predetermined amount for the purpose of the performance of the estimation of the deposit amount. In this regard, the performance of the sub fuel injection does not decrease the property of the engine and therefore, even when the estimation of the deposit amount is performed every the performance of the sub fuel injection, the property of the engine does not decreases. Thus, the estimation of the deposit amount can be performed with high frequency, while the property of the engine is maintained high by performing the estimation of the deposit amount in relation to the sub fuel injection.

Further, the increment judgment may be performed in relation to any fuel injection as far as the increment judgment is performed on the basis of the actual fuel injection amount and the required fuel injection amount corresponding thereto, the actual fuel injection being one when a fuel injection command value corresponding to the required fuel injection amount smaller than the predetermined amount is given to the fuel injector. In this regard, when the fuel injector is one for injecting the fuel directly into the combustion chamber of the engine and main and sub fuel injections are performed, the main fuel injection making the fuel injector inject the fuel at a timing so as to be able to produce a torque during one operation cycle of the engine and the sub fuel injection making the fuel injector inject the fuel at a timing so as not to be able to produce a torque before the timing of the performance of the main fuel injection, it is preferred that the increment judgment is performed on the basis of the actual fuel injection amount by the sub fuel injection when a fuel injection command value corresponding to the required fuel injection amount smaller than the predetermined amount is given to the fuel injector and the required fuel injection amount relating to the sub fuel injection at the performance of the sub fuel injection.

According to this, the estimation of the deposit amount can be performed with high frequency, while the property of the engine is maintained high. That is, when the required fuel injection amount is generally larger than or equal to a predetermined amount and the fuel of the required fuel injection amount smaller than the predetermined amount is injected from the fuel injector for the purpose of the performance of the increment judgment, the property of the engine adversely decreases. On the other hand, if the decrease of the property of the engine is maintained to the minimum, the opportunity of the injection of the fuel of the required fuel injection amount smaller than a predetermined amount from the fuel injector decreases. In this case, the frequency of the performance of the increment judgment decreases. However, if the increment judgment is performed in relation to the sub fuel injection performed for the purpose other than that of the increment judgment, it is unnecessary to forcibly make the fuel injector inject the fuel of the required fuel injection amount smaller than a predetermined amount for the purpose of the performance of the increment judgment. In this regard, the performance of the sub fuel injection does not decrease the property of the engine and therefore, even when the increment judgment is performed every the performance of the sub fuel injection, the property of the engine does not decrease. Thus, the increment judgment and estimation of the deposit amount can be performed with high frequency, while the property of the engine is maintained high by performing the increment judgment in relation to the sub fuel injection.

It should be noted that the sub fuel injection may be any fuel injection as far as it is one for injecting the fuel of the required fuel injection amount smaller than the predetermined amount from the fuel injector at the timing so as not to be able to produce a torque before the timing of the performance of the main fuel injection and for example, the sub fuel injection may be the so-called pilot fuel injection or the so-called pre-fuel injection.

Further, for example, when the fuel injector is one for injecting the fuel directly into the combustion chamber and a main fuel injection for making the fuel injector inject the fuel at a timing so as to be able to produce a torque during one operation cycle of the engine and a sub fuel injection for making the fuel injector inject the fuel at a timing so as not to be able to produce a torque after the performance of the timing of the main fuel injection, are performed, the difference between the actual fuel injection amount by the sub fuel injection when a fuel injection command value corresponding to the required fuel injection amount smaller than the predetermined amount is given to the fuel injector and the required fuel injection amount relating to the sub fuel injection at the performance of the sub fuel injection may be used for the estimation of the deposit amount as the difference between the actual fuel injection amount and the required fuel injection amount corresponding thereto.

In this case, the estimation of the deposit amount can be performed with high frequency, while the property of the engine is maintained high. That is, when the required fuel injection amount is generally larger than or equal to a predetermined amount and the fuel of the required fuel injection amount smaller than the predetermined amount is injected from the fuel injector for the purpose of the estimation of the deposit amount, the property of the engine adversely decreases. On the other hand, if the decrease of the property of the engine is maintained to the minimum, the opportunity of the injection of the fuel of the required fuel injection amount smaller than the predetermined amount from the fuel injector decreases. In this case, the frequency of the performance of the estimation of the deposit amount decreases. However, if the estimation of the deposit amount is performed in relation to the sub fuel injection performed for the purpose other than the purpose of the estimation of the deposit amount, it is unnecessary to forcibly make the fuel injector inject the fuel of the required fuel injection amount smaller than the predetermined amount for the purpose of the performance of the estimation of the deposit amount. In this regard, the performance of the sub fuel injection does not decrease the property of the engine and therefore, the property of the engine does not decrease even when the estimation of the deposit amount is performed every the performance of the sub fuel injection. Thus, the increment judgment can be performed with high frequency, while the property of the engine is maintained high by performing the estimation of the deposit amount in relation to the sub fuel injection.

Further, the increment judgment may be performed in relation to any fuel injection as far as it is performed on the basis of the actual fuel injection amount when a fuel injection command value corresponding to the required fuel injection amount smaller than the predetermined amount is given to the injector and the required fuel injection amount corresponding thereto. In this regard, when the fuel injector is one for injecting the fuel directly into the combustion chamber of the engine and a main fuel injection for making the fuel injector inject the fuel at a timing so as to be able to produce a torque during one operation cycle of the engine and a sub fuel injection for making the fuel injector inject the fuel at a timing so as not to produce a torque after the timing of the performance of the main fuel injection, are performed, it is preferred that the increment judgment is performed on the basis of the actual fuel injection amount by the sub fuel injection when the fuel injection command value corresponding to the required fuel injection amount smaller than the predetermined amount is given to the injector and the required fuel injection amount relating to the sub fuel injection at the performance of the sub fuel injection.

According to this, the estimation of the deposit amount can be performed with high frequency, while the property of the engine is maintained high. That is, when the required fuel injection amount is generally larger than or equal to the predetermined amount and the fuel of the required fuel injection amount smaller than the predetermined amount is injected from the fuel injector for the purpose of the performance of the increment judgment, the property of the engine adversely decreases. On the other hand, if the decrease of the property of the engine is maintained to the minimum, the opportunity of the injection of the fuel of the required fuel injection amount smaller than the predetermined amount from the fuel injector decreases. In this case, the frequency of the increment judgment decreases. However, if the increment judgment is performed in relation to the sub fuel injection for the purpose other than the purpose of the increment judgment, it is unnecessary to forcibly make the fuel injector inject the fuel of the required fuel injection amount smaller than the predetermined amount for the purpose of the performance of the increment judgment. In this regard, the performance of the sub fuel injection does not decrease the property of the engine and therefore, the property of the engine does not decreases even when the increment judgment is performed every the performance of the sub fuel injection. Thus, the increment judgment and estimation of the deposit amount can be performed with high frequency, while the property of the engine is maintained high by performing the increment judgment in relation to the sub fuel injection.

It should be noted that the sub fuel injection may be any fuel injection as far as it is one for injecting the fuel of the required fuel injection amount smaller than the predetermined amount from the fuel injector at a timing so as not to be able to produce a torque after the timing of the performance of the main fuel injection and for example, the sub fuel injection may be the so-called after-fuel injection or the so-called post fuel injection.

Further, the estimation of the deposit amount may be performed only when the fuel injection command value corresponding to the required fuel injection amount smaller than the predetermined amount is given to the fuel injector or the estimation of the deposit amount may be performed when the fuel injection command value corresponding to the required fuel injection amount smaller than the predetermined amount is given to the fuel injector as well as when the fuel injection command value is not given to the fuel injector. In this regard, it is preferred that a decrement judgment is performed for judging if the actual fuel injection amount when the fuel injection command value corresponding to the required fuel injection amount larger than or equal to the predetermined amount is given to the fuel injector, is smaller than the required fuel injection amount corresponding thereto and the deposit amount is estimated on the basis of the actual fuel injection amount and the required fuel injection amount corresponding thereto when it is judged that the actual fuel injection amount is smaller than the required fuel injection amount corresponding thereto by the decrement judgment.

According to this, the estimation of the deposit amount is performed at the performance of the increment judgment as well as at the performance of the decrement judgment and therefore, the estimation of the deposit amount can be performed with much high frequency.

MODE FOR CARRYING OUT THE INVENTION

Figure 1:
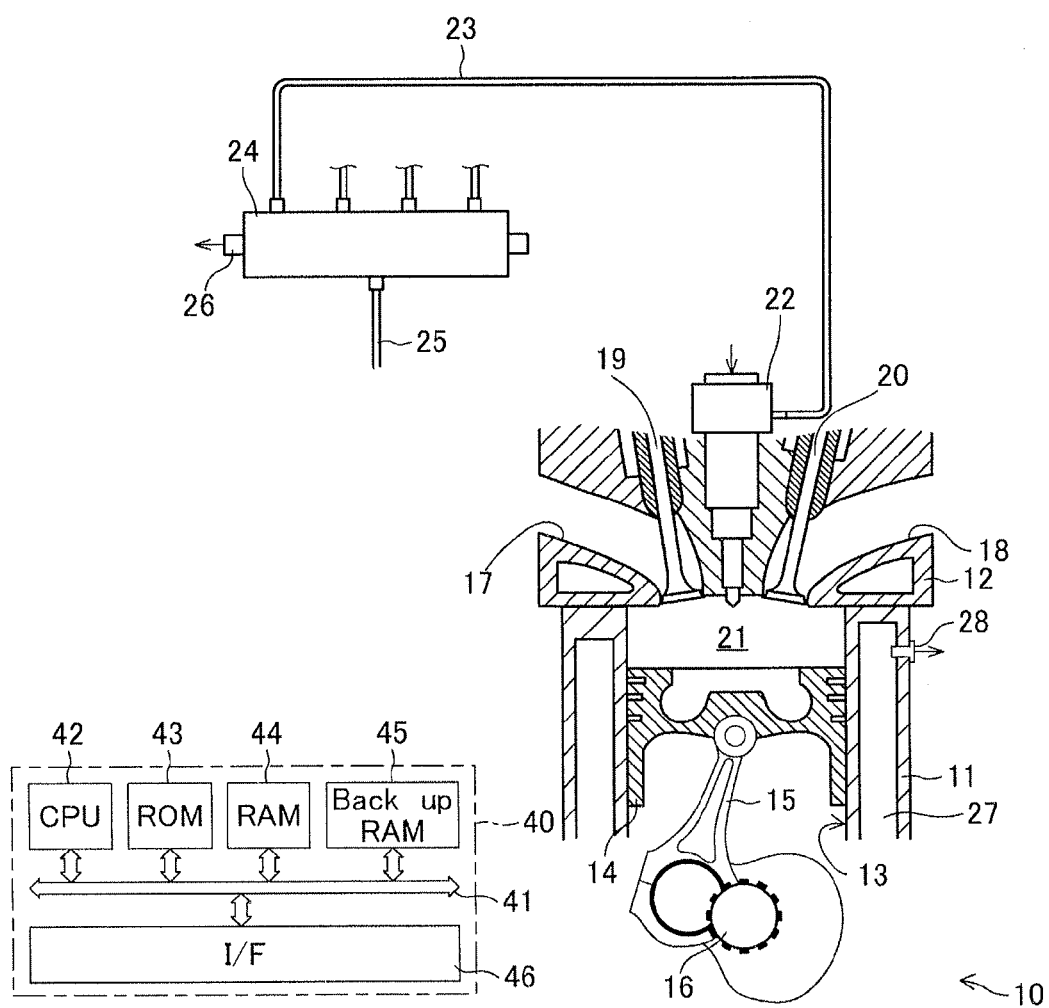
FIG. 1 is a view showing an internal combustion engine which a deposit removing amount estimation device or a deposit amount estimation device of the invention is applied.

Below, embodiments of a deposit removing amount estimation device of the invention will be explained with reference to the drawings. First, a constitution of an internal combustion engine which the deposit removing amount estimation device of the invention is applied, will be explained. The engine is shown in FIG. 1. In FIG. 1, 10 denotes a body of the engine, 11 denotes a cylinder block, and 12 denotes a cylinder head. Cylinder bores 13 are formed in the cylinder block 11. A piston 14 is housed in each of the cylinder bores 13. The piston 14 is connected to a crank shaft 16 via a connection rod 15. On the other hand, intake and exhaust ports 17 and 18 are formed in the cylinder head 12. Further, intake valves 19 for opening and closing the intake ports 17 and exhaust valves 20 for opening and closing the exhaust ports 18 are arranged in the cylinder head 12. Further, a combustion chamber 21 is defined by the upper wall face of the piston 14, the inner peripheral wall face of the cylinder bore 13 and the lower wall face of the cylinder head 12.

It should be noted that the intake port 17 is connected to an intake pipe (not shown) via an intake manifold (not shown) and constitutes a part of an intake passage. On the other hand, the exhaust port 18 is connected to an exhaust pipe (not shown) via an exhaust manifold (not shown) and constitutes a part of an exhaust passage.

Figure 2:
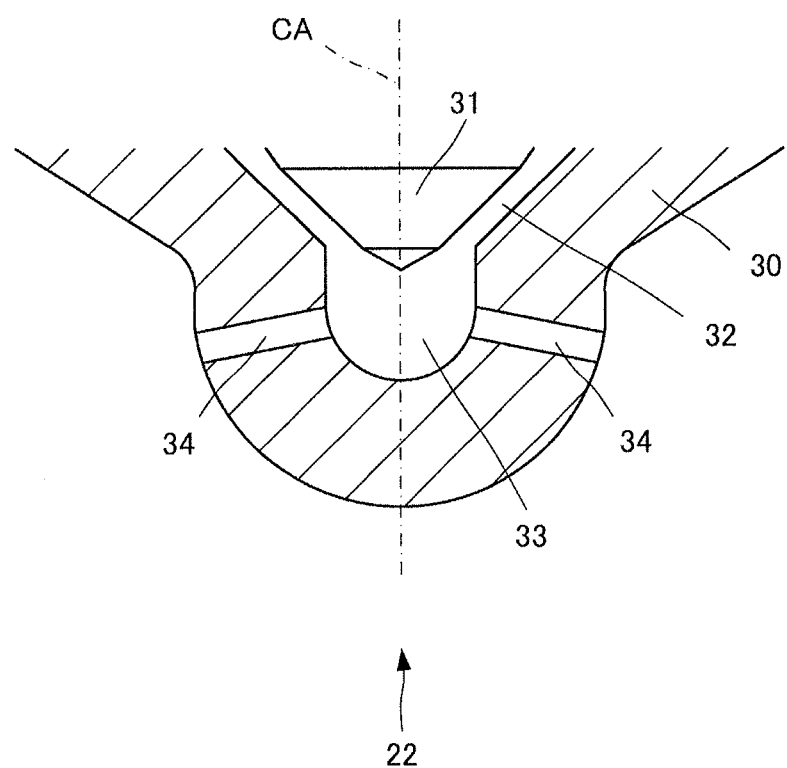
FIG. 2 is a view showing a tip portion of a fuel injector of the engine shown in FIG. 1.

Further, fuel injectors 22 are arranged in the cylinder head 12. As shown in FIG. 2, each of the fuel injectors 22 has a nozzle 30 and a needle 31. A cavity (hereinafter, will be referred to as—inner cavity—) is formed in the interior of the nozzle 30. The needle 31 is housed in the inner cavity such that the needle 31 can move along the center axis CA of the nozzle 30 (i.e. the center axis of the fuel injector 22). Further, the tip end of the needle 31 is tapered. When the needle 31 is housed in the inner cavity of the nozzle 30, a fuel passage 32 which the fuel flows, is formed between the inner periphery wall face of the nozzle 30 (i.e. the wall face defining the inner cavity of the nozzle 30) and the outer periphery wall face of the needle 31. The fuel passage 32 at the tip portion of the nozzle 30 defines a so-called sac portion 33 (hereinafter, the fuel passage 32 means the fuel passage except for the sac portion 33). Further, a plurality of fuel injection holes 34 are formed at the tip end of the nozzle 30. The fuel injection holes 34 fluidically connect the sac portion 33 in the nozzle 30 (i.e. in the fuel injector 22) to the exterior of the nozzle 30 (i.e. the exterior of the fuel injector 22).

When the needle 31 is located in the nozzle 30 such that the outer periphery wall face of the tapered tip portion of the needle 31 contacts the inner periphery wall face of the tip portion of the nozzle 30, the fluidical communication between the sac portion 33 and the fuel passage 32 is blocked off. In this case, no fuel is injected from the fuel injection holes 34 of the fuel injector 22. On the other hand, when the needle 31 is displaced in the nozzle 30 such that the outer periphery wall face of the tapered tip portion of the needle 31 is away from the inner periphery wall face of the tip portion of the nozzle 30, the fluidical communication between the sac portion 33 and the fuel passage 32 is established and the fuel flows into the sac portion 33 from the fuel passage 32. Then, the fuel flowing into the sac portion 33 flows into the fuel injection holes 34 via the inlets of the holes 34 and is injected from the outlets of the fuel injection holes 34 via the holes 34.

The fuel injector 22 is arranged in the cylinder head 12 such that it injects the fuel directly into the combustion chamber 21. In other words, the fuel injector 22 is arranged in the cylinder head 12 such that the fuel injection holes are exposed to the interior of the combustion chamber 21.

The fuel injector 22 is connected to an accumulator chamber (i.e. a so-called common rail) 24 via a fuel supply passage 23. The accumulator chamber 24 is connected to a fuel tank (not shown) via a fuel supply passage 25. The fuel is supplied to the accumulator chamber 24 from the fuel tank via the fuel supply passage 25. The fuel having a high pressure is stored in the accumulator chamber 24. The fuel having a high pressure is supplied to the fuel injector 22 from the accumulator chamber 24 via the fuel supply passage 23. A pressure sensor 26 for detecting the pressure of the fuel in the accumulator chamber 24 is arranged at the accumulator chamber 24.

A coolant water passage 27 which a coolant water flows, is formed in the cylinder block 11. The coolant water passage 27 is formed such that it surrounds the cylinder bores 13. Therefore, at least the interior of the combustion chamber 21 is cooled by the coolant water flowing through the coolant water passage 27. Further, a temperature sensor 28 for detecting a temperature of the coolant water flowing through the coolant water passage 27 is arranged on the cylinder block 11.

The engine has an electronic control unit 40. The unit 40 is constituted by a micro-computer and has a CPU (a micro processor) 42, a ROM (a read only memory) 43, a RAM (a random access memory) 44, a back-up RAM 45 and an interface 46 which are connected to each other by a bidirectional bus 41. The interface 46 is connected to the fuel injectors 22 and the pressure and temperature sensors 26 and 28. The unit 40 controls the operation of the fuel injectors 22 and receives the output value corresponding to the pressure of the fuel from the pressure sensor 26 and the output value corresponding to the temperature of the coolant water from the temperature sensor 28.

Next, the embodiment of the deposit amount estimation device of the invention applied to the above-explained engine will be explained. It should be noted that the "injection hole defining wall face" is the —wall face of the fuel injector defining the fuel injection hole of the fuel injector—, the "injection hole inlet adjacent wall face" is the —wall face of the fuel injector adjacent to the injection hole defining wall face around the inlet of the fuel injection hole of the fuel injector— and the "injection hole outlet adjacent wall face" is the —wall face of the fuel injector adjacent to the injection hole defining wall face around the outlet of the fuel injection hole of the fuel injector—. Further, the "combustion product" is the —substance produced in association with the combustion of the fuel—, the "combustion gas" is the —gas produced by the combustion of the fuel in the combustion chamber—, the "fuel injection" is the —injection of the fuel from the fuel injection hole of the fuel injector—, the "fuel injection pressure" is the —pressure of the fuel injected from the fuel injection hole of the fuel injector— and the "injection hole temperature" is the —temperature of the interior of the fuel injection hole of the fuel injector—.

In the engine which the fuel injector is arranged such that the fuel is injected directly into the combustion chamber, it is known that the combustion product deposits on the injection hole outlet adjacent wall face of the fuel injector. It has become understood by the study of the inventor of this application that the combustion product derived from metal components (for example, lower carboxylate, carbonate, oxalate, etc. and hereinafter, this combustion product will be referred to as —metal derivation product—) is produced by the reaction of the metal components (for example, zinc, calcium, magnesium, etc.) in the fuel with the combustion gas and the metal derivation product deposits on the injection hole outlet adjacent wall face. Also, it has become understood by the study of the inventor of this application that the metal derivation product deposits on the injection hole defining wall face and the injection hole inlet adjacent wall face. Below, the metal derivation product will be explained briefly Conventionally, it has been understood that no combustion product deposits on the injection hole defining wall face nor the injection hole inlet adjacent wall face. However, according to the study by the inventor of this application, as explained above, it has become understood that the combustion product in the form of the metal derivation product deposits on the injection hole defining wall face and the injection hole inlet adjacent wall face as well as the injection hole outlet adjacent wall face. It is estimated that the reason why the metal derivation product deposits on the injection hole defining wall face and the injection hole inlet adjacent wall face as explained above, is the following. That is, when the fuel injector is arranged on the engine such that the injector injects fuel directly into the combustion chamber, i.e. such that the fuel injection hole of the injector is exposed to the interior of the combustion chamber, the combustion gas flows into the fuel injection hole and reacts with the fuel in the fuel injection hole and around the inlet thereof and then, the metal derivation product is produced. The adherence of the metal derivation product to the wall face is relatively strong and therefore, the metal derivation product adheres to and deposits on the injection hole defining wall face and the injection hole inlet adjacent wall face even when the fuel flows strongly in the fuel injection hole and around the inlet thereof. It is estimated that this is the reason why the metal derivation product deposits on the injection hole defining wall face and the injection hole inlet adjacent wall face.

When there is the combustion product depositing on the injection hole outlet adjacent wall face, the injection hole defining wall face and the injection hole inlet adjacent wall face (hereinafter, these wall faces will be collectively referred to as —injection hole wall face—) as explained above, which combustion product includes the metal derivation product (hereinafter, the term "combustion product" includes the metal derivation product), the combustion product depositing on the injection hole wall face (hereinafter, the combustion product depositing on the injection hole wall face will be referred to as —deposit—) inhibits the flow of the fuel. Therefore, even when a command value which essentially can make the fuel injector inject a required amount of the fuel (hereinafter, this amount will be referred to as —required fuel injection amount—) is given to the fuel injector, there is a possibility that the fuel of the required fuel injection amount is not injected from the fuel injector.

Then, when the fuel of the required fuel injection amount is not injected from the fuel injector, there is a possibility that the output and exhaust gas emission properties of the engine decrease. Therefore, in order to restrict or improve the above-mentioned decrease of the output and exhaust gas emission properties of the engine, it is necessary and at least useful to know the possibility of the occurrence of the decrease of the above-mentioned properties. Further, in order to know the possibility of the occurrence of the decrease of the above-mentioned properties, it is necessary to exactly know the amount of the deposit on the injection hole wall face (hereinafter, this amount will be referred to as —deposit amount—).

Generally, it has been understood that when there is the deposit on the injection hole wall face, the actual fuel injection amount (i.e. the amount of the fuel actually injected from the fuel injector) is smaller than the required fuel injection amount (i.e. the amount of the fuel required to be injected from the fuel injector) and as the deposit amount becomes large, the actual fuel injection amount becomes small in comparison with the required fuel injection amount. In fact, in the case that the fuel injection amount (i.e. this means simply the —amount of the fuel injected from the fuel injector— and may be the —actual fuel injection amount— or may be the —required fuel injection amount—) is relatively large, when there is the deposit on the injection hole wall face, the actual fuel injection amount is smaller than the required fuel injection amount. However, in the case that the fuel injection amount is relatively small (in particular, the fuel injection amount is minute), when there is the deposit on the injection hole wall face, the actual fuel injection amount is larger than the required fuel injection amount, not smaller than the required fuel injection amount.

That is, when there is the deposit on the injection hole wall face, it is difficult for the fuel to flow through the fuel injection hole. Thus, not depending on the fuel injection amount, when there is the deposit on the injection hole wall face, the amount of the fuel which can pass through the fuel injection hole decreases. However, the pressure of the fuel in the sac portion of the fuel injector increases by the decrease of the amount of the fuel which can pass through the fuel injection hole. In this regard, the increase of the pressure of the fuel in the sac portion increases the speed of the opening of the needle of the fuel injector (i.e. the speed of the movement of the needle such that the outer wall face of the tapered tip portion of the needle becomes away from the inner periphery wall face of the tip portion of the nozzle). Thus, the fuel injection period (i.e. this corresponds to the period which the fuel is injected from the fuel injector and the outer wall face of the tapered tip end of the needle is away from the inner periphery wall face of the tip portion of the nozzle) is at least prolonged. On the other hand, when the fuel injection amount is relatively large, the fuel injection period is relatively long and therefore, the decrease of the fuel passing through the fuel injection hole is dominant in the fuel injection amount, rather than the prolongation of the fuel injection period by the increase of the pressure of the fuel in the sac portion. As a result, when there is the deposit on the injection hole wall face in the case that the fuel injection amount is relatively large, it is estimated that the actual fuel injection amount is smaller than the required fuel injection amount. On the other hand, when the fuel injection amount is relatively small, the fuel injection period is relatively short and therefore, the prolongation of the fuel injection period by the increase of the pressure of the fuel in the sac portion is dominant in the fuel injection amount, rather than the decrease of the fuel passing through the fuel injection hole. As a result, when there is the deposit on the injection hole wall face in the case that the fuel injection amount is relatively small, it is estimated that the actual fuel injection amount is larger than the required fuel injection amount.

The deposit amount cannot be exactly estimated unless the deposit amount is estimated in consideration that the actual fuel injection amount is larger than the required fuel injection amount when there is the deposit on the injection hole wall face in the case that the fuel injection amount is relatively small as explained above.

In this regard, according to one embodiment (hereinafter, will be referred to as—first embodiment—) of the invention, the deposit amount is estimated by using the torque difference at the performance of the minute fuel injection. That is, according to the first embodiment, when the depression amount of the acceleration pedal becomes zero (i.e. during a so-called deceleration), a fuel cut for forbidding the fuel injection (i.e. the injection of the fuel from the fuel injector), is performed. During the performance of the fuel cut, the fuel injection is forbidden, however, the minute fuel injection for making the fuel injector inject the fuel of the minute amount is performed during one operation cycle of the engine (i.e. one operation cycle including four strokes such as intake, compression, combustion and exhaust strokes). In detail, in the first embodiment, command values to be given to the fuel injector in order to make the fuel injector inject the fuel of the required fuel injection amount when there is no deposit on the injection hole wall face (hereinafter, this command value will be referred to as—fuel injection command value—) are obtained corresponding to the required fuel injection amounts and the fuel injection command value corresponding to the required fuel injection amount which is minute is given to the fuel injector at the minute fuel injection.

It should be noted that the timing of the injection of the fuel from the fuel injector by the minute fuel injection is set as the timing of the combustion of the fuel so as to produce a torque.

Further, the required fuel injection amount at the minute fuel injection may be any amount wherein the actual fuel injection amount is larger than the required fuel injection amount in the case that there is the deposit on the injection hole wall face when the fuel injection command value corresponding to the required fuel injection amount is given to the fuel injector. That is, when the largest required fuel injection amount among the required fuel injection amounts wherein the actual fuel injection amount is larger than the required fuel injection amount in the case that there is the deposit on the fuel hole wall face when the fuel injection command value corresponding to the required fuel injection amount is given to the fuel injector, is referred to as—predetermined amount—, the required fuel injection amount at the minute fuel injection may be any amount smaller than or equal to the predetermined amount. However, the minute fuel injection of the first embodiment is essentially performed during the performance of the fuel cut wherein no torque is necessary and therefore, in order to decrease the torque produced by the minute fuel injection as possible, it is preferred that the required fuel injection amount at the minute fuel injection is the smallest amount among the amounts of the fuel which can be injected from the fuel injector.

Then, in the first embodiment, the torques produced by the combustion of the fuel injected by the minute fuel injection when the actual fuel injection amount at the minute fuel injection corresponds to the required fuel injection amount are previously obtained by the experiment, etc. and then, the obtained torques are stored as base torques in the electronic control unit. Then, when the minute fuel injection is performed during the performance of the fuel cut, the torque produced by the combustion of the fuel injected by the minute fuel injection is detected (hereinafter, this torque will be referred to as—detected torque—). Then, it is judged if the detected torque is larger than the base torque. In this regard, when it is judged that the detected torque is larger than the base torque, it means that the actual fuel injection amount at the minute fuel injection is larger than the required fuel injection amount. Then, the fuel of the relatively small amount is injected from the fuel injector at the minute fuel injection and therefore, when the actual fuel injection amount is larger than the required fuel injection amount, it means that there is the deposit on the injection hole wall face. Therefore, in the first embodiment, when the detected torque is larger than the base torque, it is judged that there is the deposit on the injection hole wall face.

Then, in the first embodiment, when it is judged that there is the deposit on the injection hole wall face (i.e. when the detected torque is larger than the base torque), the difference between the detected and base torques is calculated as a torque difference by subtracting the base torque from the detected torque. Then, the difference between the actual and required fuel injection amounts (this difference corresponds to a value obtained by subtracting the required fuel injection amount from the actual fuel injection amount and hereinafter, will be referred to as—increment of the fuel injection amount—) is calculated on the basis of the calculated torque difference. It should be noted that the thus calculated increment of the fuel injection amount is large as the torque difference is large.

Figure 3:
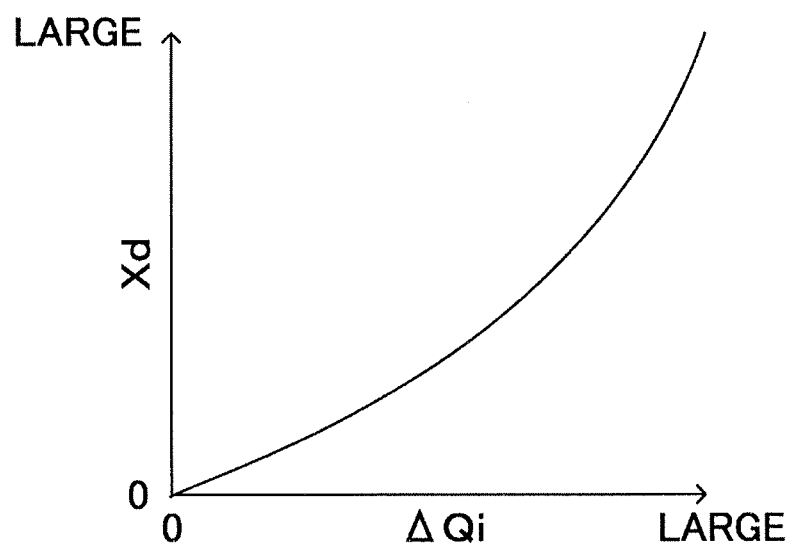
FIG. 3 is a view showing a map used to obtain a deposit amount Xd on the basis of an increment $\Delta$ Qi of a fuel injection amount.

In the first embodiment, deposit amounts, each of which corresponds to the increment of the fuel injection amount when the actual fuel injection amount is larger than the required fuel injection amount at the performance of the minute fuel injection, are previously obtained by the experiment, etc. and then, as shown in FIG. 3, the obtained deposit amounts Xd are stored in the electronic control unit in the form of a map as a function of the increment ΔQi of the fuel injection amount. Then, the deposit amount Xd is calculated from the map shown in FIG. 3 on the basis of the increment ΔQi of the fuel injection amount calculated at the performance of the minute fuel injection. It should be noted that the calculated deposit amount Xd is large as the increment ΔQi of the fuel injection amount is large.

The fuel injection amount is relatively small at the minute fuel injection and therefore, when there is the deposit on the injection hole wall face at the performance of the minute fuel injection, the actual fuel injection amount is larger than the required fuel injection amount. In the first embodiment, in consideration of this fact, the deposit amount is calculated. Therefore, according to the first embodiment, the deposit amount is exactly calculated.

It should be noted that in the first embodiment, a map for calculating the deposit amount on the basis of the increment Δ Qi of the fuel injection amount is prepared as a map for calculating the deposit amount and therefore, the torque difference is converted to the increment Δ Qi of the fuel injection amount and then, the deposit amount is calculated by using the increment Δ Qi of the fuel injection amount. In this regard, a map for calculating the deposit amount on the basis of the torque difference may be prepared as a map for calculating the deposit amount and then, the deposit amount may be calculated by directly using the torque difference. Therefore, in the first embodiment, it can be said that the deposit amount is calculated on the basis of the increment of the fuel injection amount at the minute fuel injection or the deposit amount is calculated on the basis of the torque difference at the minute fuel injection.

Further, in the first embodiment, it is judged if the detected torque is larger than the base torque at the performance of the minute fuel injection. In this regard, the detected torque is one corresponding to the actual fuel injection amount at the minute fuel injection, while the base torque is one corresponding to the required fuel injection amount at the minute fuel injection. Therefore, in the first embodiment, it can be also said that it is judged if the actual fuel injection amount is larger than the required fuel injection amount at the performance of the minute fuel injection.

Figure 4:
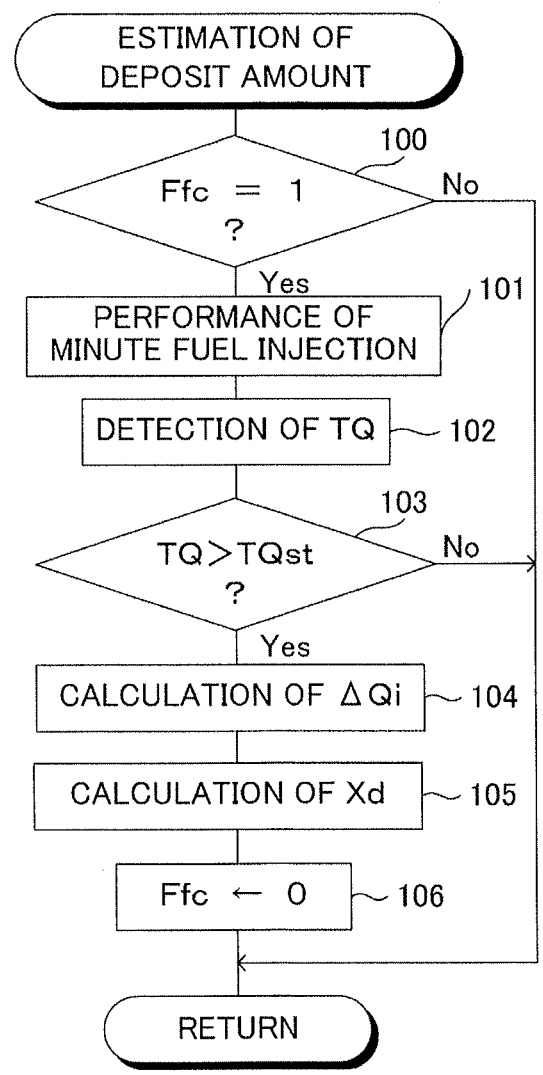
FIG. 4 is a view showing an example of a routine for performing an estimation of a deposit amount of the first embodiment.

Next, an example of a routine for performing the calculation of the deposit amount of the first embodiment will be explained. This routine is shown in FIG. 4. The routine shown in FIG. 4 is performed every a predetermined time period is elapsed.

When the routine shown in FIG. 4 starts, first, at the step 100, it is judged if a fuel cut flag Ffc is set (Ffc=1). The fuel cut flag Ffc is set when the fuel cut starts and is reset when the deposit amount has been calculated by the routine shown in FIG. 4. At the step 100, when it is judged that Ffc=1, the routine proceeds to the step 101. On the other hand, when it is judged that Ffc=0, the routine is terminated directly.

When it is judged that Ffc=1 and then, the routine proceeds to the step 101, the minute fuel injection is performed. Next, at the step 102, the torque TQ is detected. Next, at the step 103, it is judged if the torque detected at the step 102 (i.e. the detected torque) TQ is larger than the base torque TQst (TQ>TQst). In this regard, when it is judged that TQ>TQst (i.e. the actual fuel injection amount is larger than the required fuel injection amount and therefore, a torque larger than the base torque is produced), the routine proceeds to the step 104. On the other hand, when it is judged that TQ≤TQst, the routine is terminated directly.

When it is judged that TQ>TQst at the step 103 and then, the routine proceeds to the step 104, the increment Δ Qi of the fuel injection amount is calculated on the basis of a difference between the torque TQ detected at the step 102 and the base torque TQst (i.e. the torque difference). Next, at the step 105, the deposit amount Xd is calculated from the map shown in FIG. 3 on the basis of the increment Δ Qi of the fuel injection amount calculated at the step 104. Next, at the step 106, the fuel cut flag Ffc is reset (Ffc←0) and then, the routine is terminated.

Next, the second embodiment will be explained. In the second embodiment, the deposit amount is estimated by using a learned amendment value which is learned by a minute fuel injection amount learning. Below, the estimation of the deposit amount will be explained, however, before this explanation, the minute fuel injection amount learning will be explained.

In the second embodiment, when the depression of the acceleration pedal becomes zero, the fuel cut is performed. Then, the fuel injection is forbidden during the performance of the fuel cut and on the contrary, the same minute fuel injection as that of the first embodiment is performed during one operation cycle of the engine.

In the second embodiment, the torques, which are produced by the combustion of the fuel injected by the minute fuel injection when the actual fuel injection amount at the minute fuel injection corresponds to the required fuel injection amount, are obtained by the experiment, etc. and then, the obtained torques are stored in the electronic control unit as base torques. Then, when the minute fuel injection is performed during the performance of the fuel cut, the torque produced by the combustion of the fuel injected by the minute fuel injection is detected (hereinafter this torque will be referred to as—detected torque—). Then, the difference between the detected and base torques is calculated as a torque difference by subtracting the base torque from the detected torque.

In this regard, when the torque difference is zero, the actual fuel injection amount corresponds to the required fuel injection amount and therefore, it is unnecessary to amend the fuel injection command value corresponding to the required fuel injection amount.

On the other hand, when the torque difference is larger than zero, the actual fuel injection amount is larger than the required fuel injection amount and therefore, in order to make the actual fuel injection amount correspond to the required fuel injection amount, it is necessary to shorten the fuel injection time period (i.e. the time period for injecting the fuel from the fuel injection hole) by amending the fuel injection command value such that the fuel injection command value corresponding to the required fuel injection amount becomes small. In this regard, when the torque difference is larger than zero, the amendment value for decreasing the fuel injection command value is calculated, the learned amendment value is updated by adding the calculated amendment value to the learned amendment value which was updated and stored (i.e. learned) in the electronic control unit at the last performance of the minute fuel injection amount learning, and then, is stored (i.e. learned) in the electronic control unit as a new learned amendment value. It should be noted that in the second embodiment, when the torque difference is larger than zero, the amendment value larger than zero is calculated. Therefore, the learned amendment value becomes large by adding the amendment value to the learned amendment value.

On the other hand, when the torque difference is smaller than zero, the actual fuel injection amount is smaller than the required fuel injection amount and therefore, in order to make the actual fuel injection amount correspond to the required fuel injection amount, it is necessary to lengthen the fuel injection time period by amending the fuel injection command value such that the fuel injection command value corresponding to the required fuel injection amount becomes larger. In this regard, when the torque is smaller than zero, the amendment value for increasing the fuel injection command value is calculated and then, the learned amendment value is updated by adding the calculated amendment value to the learned amendment value which was updated and stored (i.e. learned) in the electronic control unit at the last performance of the minute fuel injection amount learning, and then, is stored (i.e. learned) in the electronic control unit as a new learned amendment value. It should be noted that when the torque difference is smaller than zero, the amendment value smaller than zero is calculated. Therefore, the learned amendment value becomes small by adding the amendment value to the learned amendment value.

Then, the fuel injection command value is amended by subtracting the learned amendment value from the fuel injection command value corresponding to the required fuel injection amount when the required fuel injection amount is relatively small and then, the amended fuel injection command is given to the fuel injector. According to this, when the required fuel injection amount is relatively small, it is possible to make the actual fuel injection amount correspond to the required fuel injection amount.

In the case that the fuel injection command value corresponding to the required fuel injection amount is given to the fuel injector at the minute fuel injection when there is the deposit on the fuel hole wall face, the actual fuel injection amount is larger than the required fuel injection amount. On the other hand, at the minute fuel injection amount learning of the second embodiment, when the torque difference at the performance of the minute fuel injection is larger than zero, that is, when the actual fuel injection amount at the performance of the minute fuel injection is larger than the required fuel injection amount, the amendment value larger than zero is calculated and then, the amendment value is added to the learned amendment value. Therefore, in the case that the learned amendment value is larger than zero, when the fuel injection command value corresponding to the required fuel injection amount is given to the fuel injector at the minute fuel injection, the actual fuel injection amount becomes larger than the required fuel injection amount. That is, when the learned amendment value is larger than zero, there is the deposit on the injection hole wall face. In this regard, the difference between the actual and required fuel injection amounts (i.e. the increment of the fuel injection amount) is large as the learned amendment value is large and the deposit amount is large as the increment of the fuel injection amount is large.

In this regard, in the second embodiment, when the learned amendment value is learned by the minute fuel injection amount leaning, this learned amendment value is acquired. Then, it is judged if the learned amendment value is larger than zero. In this regard, when it is judged that the learned amendment value is larger than zero, the actual fuel injection amount at the minute fuel injection is larger than the required fuel injection amount. In this regard, the fuel of the relatively small amount is injected from the fuel injector at the minute fuel injection and therefore, when the actual fuel injection amount is larger than the required fuel injection amount, there is the deposit on the injection hole wall face. Therefore, in the second embodiment, when the learned amendment value is larger than zero, it is judged that there is the deposit on the injection hole wall face.

Then, in the second embodiment, when it is judged that there is the deposit on the injection hole wall face (i.e. when the learned amendment value is larger than zero), the increment of the fuel injection amount (this increment corresponds to a value obtained by subtracting the required fuel injection amount from the actual fuel injection amount) is calculated on the basis of the learned amendment value. It should be noted that the thus calculated increment of the fuel injection amount is large as the learned amendment value is large. Then, the deposit amount Xd is calculated from the map shown in FIG. 3 on the basis of the thus calculated increment $\Delta Qi$ of the fuel injection amount. It should be noted that the thus calculated deposit amount Xd is large as the increment $\Delta Qi$ of the fuel injection amount is large.

The fuel injection amount is relatively small at the minute fuel injection and therefore, when there is the deposit on the injection hole wall face at the performance of the minute fuel injection, the actual fuel injection amount is larger than the required fuel injection amount. In the second embodiment, in consideration of this fact, the deposit amount is calculated. Therefore, according to the second embodiment, the deposit amount is exactly calculated.

It should be noted that in the second embodiment, the map for calculating the deposit amount on the basis of the increment $\Delta Qi$ of the fuel injection amount is prepared as the map for calculating the deposit amount and therefore, the learned amendment value is converted to the increment $\Delta Qi$ of the fuel injection amount and the deposit amount is calculated by using the increment $\Delta Qi$ of the fuel injection amount. In this regard, a map for calculating the deposit amount on the basis of the learned amendment value may be prepared as the map for calculating the deposit amount and then, the deposit amount may be directly calculated by using the learned amendment value. Therefore, it can be said that in the second embodiment, the deposit amount is calculated on the basis of the increment of the fuel injection amount at the minute fuel injection or the deposit amount is calculated on the basis of the learned amendment value.

Further, in the second embodiment, it is judged if the learned amendment value is larger than zero at the performance of the minute fuel injection amount learning. In this regard, the learned amendment value is one corresponding to the increment of the fuel injection amount. Therefore, in the second embodiment, it can be also said that it is judged if the actual fuel injection amount is larger than the required fuel injection amount at the performance of the minute fuel injection amount learning.

Figure 5:
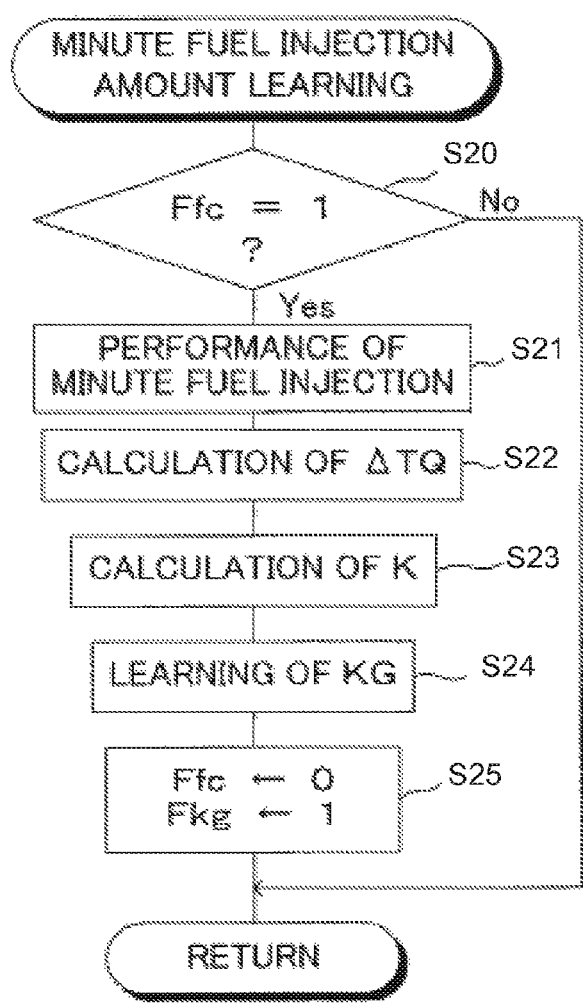
FIG. 5 is a view showing an example of a routine for performing a minute fuel injection amount learning of the second embodiment.

Next, an example of the routine for performing the minute fuel injection amount learning of the second embodiment will be explained. This routine is shown in FIG. 5. It should be noted that the routine shown in FIG. 5 is performed every a predetermined time period is elapsed.

When the routine shown in FIG. 5 starts, first, at the step S20, it is judged if a fuel cut flag Ffc is set (Ffc=1). The fuel cut flag Ffc is set when the fuel cut starts and is reset when the learned amendment value has been learned by the routine shown in FIG. 5. When it is judged that Ffc=1 at the step S20, the routine proceeds to the step S21. On the other hand, when it is judged that Ffc=0, the routine is terminated directly When it is judged that Ffc=1 at the step S20 and then, the routine proceeds to the step S21, the minute fuel injection is performed. Next, at the step S22, the torque difference $\Delta TQ$ is calculated. Next, at the step S23, an amendment value K is calculated on the basis of the torque difference $\Delta TQ$ calculated at the step S22. Next, at the step S24, a new learned amendment value KG is learned by adding the amendment value K calculated at the step S23 to the learned amendment value learned at the step S24 at the last performance of the routine shown in FIG. 5. Next, at the step S25, the fuel cut flag Ffc is reset (Ffc←0) and a learning completion flag Fkg used in a routine shown in FIG. 6 is set (Fkg←1) and then, the routine is terminated.

Next, an example of the routine for performing the estimation of the deposit amount of the second embodiment will be explained. This routine is shown in FIG. 6. It should be noted that the routine shown in FIG. 6 is performed every a predetermined time period is elapsed.

Figure 6:
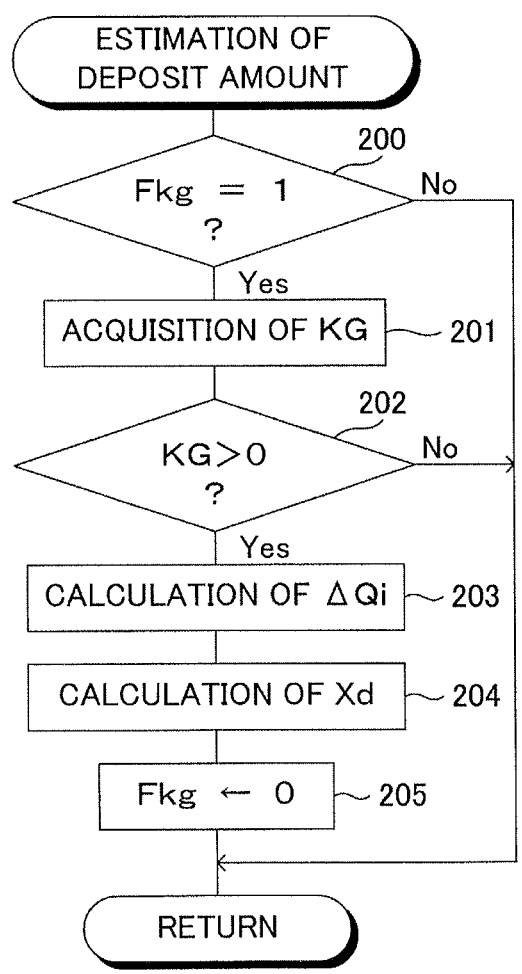
FIG. 6 is a view showing an example of a routine for performing the estimation of the deposit amount of the second embodiment.

When the routine shown in FIG. 6 starts, first, at the step 200, it is judged if the leaning completion flag Fkg is set (Fkg=1). The learning completion flag Fkg is set when the learning of the learned amendment value is completed by the routine shown in FIG. 5 (in particular, at the step S25 of the routine shown in FIG. 5) and is reset when the deposit amount is calculated by the routine shown in FIG. 6. When it is judged that Fkg=1 at the step 200, the routine proceeds to the step 201. On the other hand, when it is judged that Fkg=0, the routine is terminated directly.

When it is judged that Fkg=1 at the step 200 and then, the routine proceeds to the step 201, the learned amendment value KG learned at the step S24 of the routine shown in FIG. 5 is acquired. Next, at the step 202, it is judged if the learned amendment value acquired at the step 201 is larger than zero (KG>0). In this regard, when it is judged that KG>0 (i.e. when the actual fuel injection amount is larger than the required fuel injection amount and therefore, the learned amendment value is larger than zero), the routine proceeds to the step 203. On the other hand, when it is judged that KG≤0, the routine is terminated directly.

When it is judged that KG>0 at the step 202 and then, the routine proceeds to the step 203, an increment $\Delta Qi$ of the fuel injection amount is calculated on the basis of the learned amendment value KG acquired at the step 201. Next, at the step 204, the deposit amount Xd is calculated from the map shown in FIG. 3 on the basis of the increment $\Delta Qi$ of the fuel injection amount calculated at the step 203. Next, at the step 205, the learning completion flag Fkg is reset (Fkg←0) and then, the routine is terminated.

Next, the third embodiment will be explained. In the third embodiment, the deposit amount is estimated by using a particulate production amount difference at the performance of a pilot fuel injection. Below, this estimation of the deposit amount will be explained, however, before this explanation, the pilot fuel injection will be explained.

When a fuel injection for making the fuel injector inject the fuel at a timing so as to produce a torque during one operation cycle of the engine will be referred to as—main fuel injection—, in the third embodiment, a pilot fuel injection mode for performing a sub fuel injection (this sub fuel injection is the—pilot fuel injection—) for making the fuel injector inject the fuel at a timing so as not to produce a torque before the timing of the performance of the main fuel injection is prepared. The fuel injected from the fuel injector by the pilot fuel injection (hereinafter, this fuel will be referred to as—pilot fuel—) burns before the timing of the performance of the main fuel injection. Then, the temperature in the combustion chamber is increased by the combustion of the pilot fuel, and as a result, the ignition property of the fuel injected from the fuel injector by the main fuel injection (hereinafter, this fuel will referred to as—main fuel—) is improved, while the amount of the particulates produced due to the combustion of the main fuel is decreased. In the third embodiment, the pilot combustion injection mode is selected, depending on the operation state of the engine (for example, when the improvement of the ignition property of the main fuel is required or when the decrease of the amount of the particulate produced due to the combustion of the main fuel is required) and then, the pilot fuel injection is performed.

In the case that the fuel injection command value corresponding to the required fuel injection amount is given to the fuel injector at the minute fuel injection when there is the deposit on the injection hole wall face, the actual fuel injection amount is larger than the required fuel injection amount. On the other hand, the amount of the pilot fuel (i.e. the fuel injected from the fuel injector by the pilot fuel injection) is small such that the actual fuel injection amount is larger than the required fuel injection amount when there is the deposit on the injection hole wall face. That is, it can be said that the pilot fuel injection is the minute fuel injection. Further, when the pilot fuel injection is performed, the amount of the particulates (hereinafter, this amount will be referred to as—particulate production amount—) produced due to the combustion of the main fuel (i.e. the fuel injected from the fuel injector by the main fuel injection) decreases. In this regard, the particulate production amount is small as the amount of the pilot fuel is large.

In the third embodiment, particulate production amounts when the actual fuel injection amount at the pilot fuel injection corresponds to the required fuel injection amount are previously obtained by the experiment, etc. and then, the obtained particulate production amounts are stored in the electronic control unit as base particulate production amounts. Then, the particulate production amount at the performance of the pilot fuel injection is detected (hereinafter, this particulate production amount will be referred to as—detected particulate production amount—). Then, it is judged if the detected particulate production amount is smaller than the base particulate production amount. In this regard, when it is judged that the detected particulate production amount is smaller than the base particulate production amount, the actual fuel injection amount at the pilot fuel injection is larger than the required fuel injection amount. The fuel of the relatively small amount is injected from the fuel injector at the pilot fuel injection and therefore, when the actual fuel injection amount is larger than the required fuel injection amount, there is the deposit on the injection hole wall face. Therefore, in the third embodiment, when the detected particulate production amount is larger than the base particulate production amount, it is judged that there is the deposit on the injection hole wall face.

In the third embodiment, when it is judged that there is the deposit on the injection hole wall face (i.e. when the detected particulate production amount is smaller than the base particulate production amount), the difference between the base and detected particulate production amounts is calculated as the particulate production amount difference by subtracting the detected particulate production amount from the base particulate production amount. Then, the increment of the fuel injection amount (this increment corresponds to a value obtained by subtracting the required fuel injection amount from the actual fuel injection amount) is calculated on the basis of the thus calculated particulate production amount difference. It should be noted that the thus calculated increment of the fuel injection amount is large as the particulate production amount difference is large.

Then, in the third embodiment, the deposit amount Xd is calculated from the map shown in FIG. 3 on the basis of the increment $\Delta Qi$ of the thus calculated fuel injection amount. It should be noted that the thus calculated deposit amount Xd is large as the increment $\Delta Qi$ of the fuel injection amount is large.

The fuel injection amount is relatively small at the pilot fuel injection and therefore, when there is the deposit on the injection hole wall face at the performance of the pilot fuel injection, the actual fuel injection amount is larger than the required fuel injection amount. In the third embodiment, in consideration of this fact, the deposit amount is calculated. Therefore, according to the third embodiment, the deposit amount is exactly calculated.

It should be noted that in the third embodiment, the map for calculating the deposit amount on the basis of the increment $\Delta$ Qi of the fuel injection amount is prepared as the map for calculating the deposit amount and therefore, the particulate production amount difference is converted to the increment $\Delta$ Qi of the fuel injection amount and the deposit amount is calculated by using the increment $\Delta$ Qi of the fuel injection amount. However, a map for calculating the deposit amount on the basis of the particulate production amount difference may be prepared as the map for calculating the deposit amount and then, the deposit amount may be directly calculated by using the particulate production amount difference. Therefore, it can be said that in the third embodiment, the deposit amount is calculated on the basis of the increment of the fuel injection amount at the pilot fuel injection or the deposit amount is calculated on the basis of the particulate production amount difference at the pilot fuel injection.

Further, in the third embodiment, it is judged if the detected particulate production amount is smaller than the base particulate production amount at the performance of the pilot fuel injection. In this regard, the detected particulate production amount is one corresponding to the actual fuel injection amount at the pilot fuel injection and the base particulate production amount is one corresponding to the required fuel injection amount at the pilot fuel injection. Therefore, it can be said that in the third embodiment, it is judged if the actual fuel injection amount is larger than the required fuel injection amount at the performance of the pilot fuel injection.

It should be noted that when a pre-fuel injection mode for performing the sub fuel injection for making the fuel injector inject the fuel at a timing so as not to produce a torque before the timing of the performance of the main fuel injection (this sub fuel injection is the so-called—pre-fuel injection—) is prepared in order to decrease the amount of the nitrogen oxide (NOx) (hereinafter, this amount will be referred to as—NOx production amount—) produced due to the combustion of the main fuel (i.e. the fuel injected from the fuel injector by the main fuel injection), the amount of the fuel injected from the fuel injector by the pre-fuel injection is small such that the actual fuel injection amount is larger than the required fuel injection amount when there is the deposit on the injection hole wall face. That is, it can be said that the pre-fuel injection is the minute fuel injection. In this regard, when the pre-fuel injection mode is prepared, in the third embodiment, the deposit amount may be estimated by using the NOx production amount difference at the performance of the pre-fuel injection in place of the particulate production amount difference at the performance of the pilot fuel injection. In this case, base NOx production amount previously obtained by the experiment, etc. as NOx production amount when the actual fuel injection amount at the pre-fuel injection corresponds to the required fuel injection amount and stored in the electronic control unit as base NOx production amount is used in place of the base particulate production amount and the NOx production amount detected at the performance of the pre-fuel injection is used in place of the detected particulate production amount. Further, the NOx production amount difference calculated by subtracting the detected NOx production amount from the base NOx production amount is used in place of the particulate production amount difference. It should be noted that the increment of the fuel injection amount calculated on the basis of the NOx production amount difference is large as the NOx production amount difference is large.

That is, the idea included in the third embodiment can be applied to the case that a fuel injection mode for performing the sub fuel injection for making the fuel injector inject the fuel at a timing so as not to produce a torque before the timing of the performance of the main fuel injection for a specified purpose is prepared and there is a parameter correlative with the difference between the actual and required fuel injection amounts at the sub fuel injection.

Figure 7:
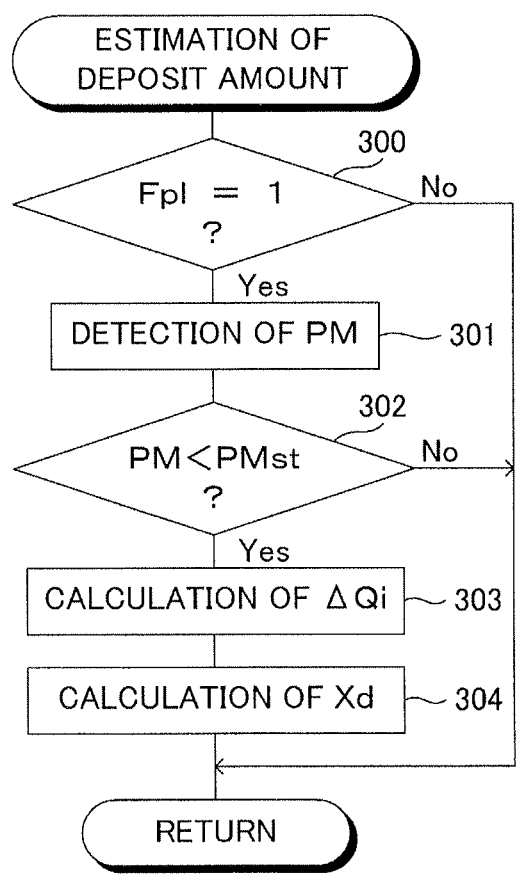
FIG. 7 is a view showing an example of a routine for performing the estimation of the deposit amount of the third embodiment.

Next, an example of the routine for performing the estimation of the deposit amount of the third embodiment will be explained. This routine is shown in FIG. 7. It should be noted that the routine shown in FIG. 7 is performed every a predetermined time period is elapsed.

When the routine shown in FIG. 7 starts, first, at the step 300, it is judged if a pilot fuel injection flag FpI is set (FpI=1). The pilot fuel injection flag FpI is set when the pilot fuel injection mode is selected and is reset when the selection of the pilot fuel injection mode is cancelled. When it is judged that FpI=1 at the step 300, the routine proceeds to the step 301. On the other hand, when it is judged that FpI=0, the routine is terminated directly.

When it is judged that FpI=1 at the step 300 and then, the routine proceeds to the step 301, the particulate production amount PM is detected. Next, at the step 302, it is judged if the particulate production amount PM detected at the step 301 (i.e. the detected particulate production amount) is smaller than the base particulate production amount PMst (PM<PMst). In this regard, when it is judged that PM<PMst (i.e. when the actual fuel injection amount at the pilot fuel injection is larger than the required fuel injection amount and therefore, the particulate production amount is smaller than the base particulate production amount), the routine proceeds to the step 303. On the other hand, when it is judged that PM≥PMst, the routine is terminated directly.

When it is judged that PM<PMst at the step 302 and then, the routine proceeds to the step 303, the increment $\Delta$ Qi of the fuel injection amount is calculated on the basis of the difference between the particulate production amount PM detected at the step 301 and the base particulate production amount PMst (i.e. the particulate production amount difference). Next, at the step 304, the deposit amount Xd is calculated from the map shown in FIG. 3 on the basis of the increment $\Delta$ Qi of the fuel injection amount calculated at the step 303 and then, the routine is terminated.

Next, the fourth embodiment will be explained. In the fourth embodiment, the deposit amount is estimated by using a catalyst temperature difference at the performance of a post fuel injection. Below, this estimation of the deposit amount will be explained, however, before this explanation, the post fuel injection will be explained.

When a fuel injection for making the fuel injector inject the fuel at a timing so as to be able to produce a torque during one operation cycle of the engine (for example, at the timing around the compression top dead center) is referred to as—main fuel injection—, in the fourth embodiment, a post fuel injection mode for performing a sub fuel injection for making the fuel injector inject fuel (this sub fuel injection is the—post fuel injection—) at a timing so as not to be able to produce a torque before the timing of the performance of the main fuel injection (for example, at the timing during the exhaust stroke) is prepared. The fuel injected from the fuel injector by the post fuel injection (hereinafter, this fuel will be referred to as—post fuel—) is discharged from the combustion chamber to the exhaust passage without burning in the combustion chamber and then, reaches to an exhaust gas purification catalyst (not shown) arranged in the exhaust passage. The temperature of the exhaust gas purification catalyst (hereinafter, this temperature will be referred to as—catalyst temperature—) is increased by the combustion of the fuel reaching to the exhaust gas purification catalyst. In the fourth embodiment, the post fuel injection mode is selected, depending on the operation state of the engine (for example, when the increase of the catalyst temperature is required) and then, the post fuel injection is performed.

In the case that the fuel injection command value corresponding to the required fuel injection amount is given to the fuel injector at the minute fuel injection when there is the deposit on the injection hole wall face, the actual fuel injection amount is larger than the required fuel injection amount. On the other hand, the amount of the post fuel (i.e. the fuel injected from the fuel injector by the post fuel injection) is small such that the actual fuel injection amount is larger than the required fuel injection amount when there is the deposit on the injection hole wall face. That is, it can be said that the post fuel injection is the minute fuel injection. Further, when the post fuel injection is performed, the catalyst temperature is increased. The degree of this increase of the catalyst temperature is large as the amount of the post fuel is large.

In the fourth embodiment, catalyst temperatures when the actual fuel injection amount corresponds to the required fuel injection amount at the post fuel injection are previously obtained by the experiment, etc. and then, the obtained catalyst temperatures are stored in the electronic control unit as base catalyst temperatures. Then, the catalyst temperature at the performance of the post fuel injection is detected (hereinafter, this catalyst temperature will be referred to as—detected catalyst temperature—). Then, it is judged if the detected catalyst temperature is higher than the base catalyst temperature. In this regard, when it is judged that the detected catalyst temperature is higher than the base catalyst temperature, the actual fuel injection amount at the post fuel injection is larger than the required fuel injection amount. In this regard, the fuel of the relatively small amount is injected from the fuel injector at the post fuel injection and therefore, when the actual fuel injection amount is larger than the required fuel injection amount, there is the deposit on the injection hole wall face. Therefore, in the fourth embodiment, when the detected catalyst temperature is higher than the base catalyst temperature, it is judged that there is the deposit on the injection hole wall face.

In the fourth embodiment, when it is judged that there is the deposit on the injection hole wall face (i.e. when the detected catalyst temperature is higher than the base catalyst temperature), a difference between the detected and base catalyst temperatures is calculated as a catalyst temperature difference by subtracting the base catalyst temperature from the detected catalyst temperature. Then, the increment of the fuel injection amount (this increment corresponds to the value obtained by subtracting the required fuel injection amount from the actual fuel injection amount) is calculated on the thus calculated catalyst temperature difference. It should be noted that the thus calculated increment of the fuel injection amount is large as the catalyst temperature difference is large.

Then, in the fourth embodiment, the deposit amount Xd is calculated from the map shown in FIG. 3 on the basis of the increment $\Delta Qi$ of the thus calculated fuel injection amount. It should be noted that the thus calculated deposit amount Xd is large as the increment $\Delta Qi$ of the fuel injection amount is large.

The fuel injection amount is relatively small at the post fuel injection and therefore, when there is the deposit on the injection hole wall face at the performance of the post fuel injection, the actual fuel injection amount is larger than the required fuel injection amount. In the fourth embodiment, in consideration of this fact, the deposit amount is calculated. Therefore, according to the fourth embodiment, the deposit amount is exactly calculated.

It should be noted that in the fourth embodiment, a map for calculating the deposit amount on the basis of the increment $\Delta Qi$ of the fuel injection amount is prepared as the map for calculating the deposit amount and therefore, the catalyst temperature difference is converted to the increment $\Delta Qi$ of the fuel injection amount and then, the deposit amount is calculated by using the increment $\Delta Qi$ of the fuel injection amount. However, a map for calculating the deposit amount on the basis of the catalyst temperature difference may be prepared as the map for calculating the deposit amount and then, the deposit amount may be directly calculated by using the catalyst temperature difference. Therefore, it can be said that in the fourth embodiment, the deposit amount is calculated on the basis of the increment of the fuel injection amount at the post fuel injection or the deposit amount is calculated on the basis of the catalyst temperature difference at the post fuel injection.

Further, in the fourth embodiment, it is judged if the detected catalyst temperature is higher than the base catalyst temperature at the performance of the post fuel injection. In this regard, the detected catalyst temperature is one corresponding to the actual fuel injection amount at the post fuel injection and the base catalyst temperature is one corresponding to the required fuel injection amount at the post fuel injection. Therefore, it can be said that in the fourth embodiment, it is judged if the actual fuel injection amount is larger than the required fuel injection amount at the performance of the post fuel injection.

It should be noted that when an after fuel injection mode for performing a sub fuel injection (this sub fuel injection is the so-called—after fuel injection—) for making the fuel injector inject the fuel at a timing so as not to produce a torque after the timing of the performance of the main fuel injection is prepared in order to decrease the amount of the particulates discharged from the combustion chamber (hereinafter, this amount will be referred to as—particulate discharge amount—) by the combustion of the particulates produced due to the combustion of the main fuel (i.e. the fuel injected from the fuel injector by the main fuel injection), the amount of the fuel injected from the fuel injector at the after fuel injection is small such that the actual fuel injection amount is larger than the required fuel injection amount when there is the deposit on the injection hole wall face. That is, it can be said that the after fuel injection is the minute fuel injection. When the after fuel injection mode is prepared, in the fourth embodiment, the deposit amount may be estimated by using the particulate discharge amount difference at the performance of the after fuel injection in place of the catalyst temperature difference at the performance of the post fuel injection. In this case, a base particulate discharge amount previously obtained by the experiment, etc. as a particulate discharge amount when the actual fuel injection amount corresponds to the required fuel injection amount at the after fuel injection and stored in the electronic control unit, is used in place of the base catalyst temperature and the particulate discharge amount detected at the performance of the after fuel injection is used in place of the detected particulate production amount. Further, the particulate discharge amount difference calculated by subtracting the detected particulate discharge amount from the base particulate discharge amount is used in place of the particulate production amount difference. It should be noted that the increment of the fuel injection amount calculated on the basis of the particulate discharge amount difference is large as the particulate discharge amount difference is large.

That is, the idea included in the fourth embodiment can be applied to the case that a fuel injection mode for performing a sub fuel injection for making the fuel injector inject the fuel at a timing so as not to be able to produce a torque after the timing of the main fuel injection for the specified purpose is prepared and there is a parameter correlative with the difference between the actual and required fuel injection amounts at the sub fuel injection.

Figure 8:
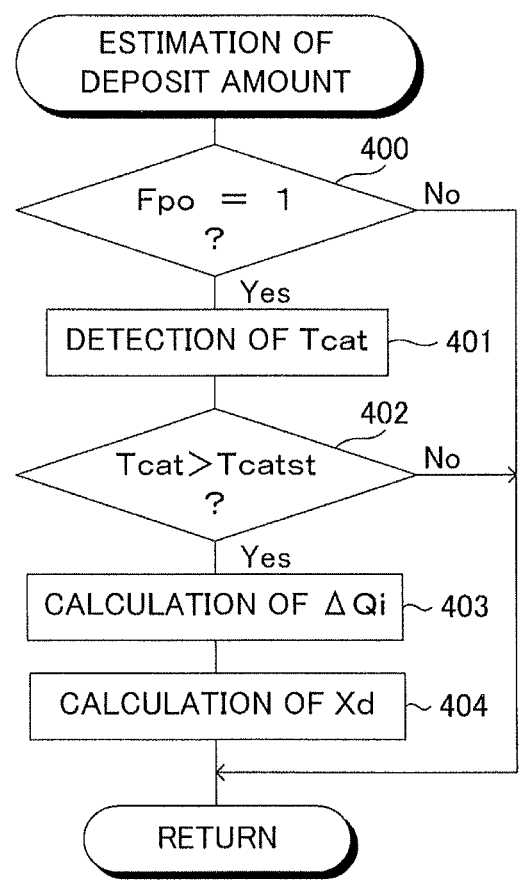
FIG. 8 is a view showing an example of a routine for performing the estimation of the deposit amount of the fourth embodiment.

Next, an example of the routine for performing the estimation of the deposit amount of the fourth embodiment will be explained. This routine is shown in FIG. 8. It should be noted that the routine shown in FIG. 8 is performed every a predetermined time period is elapsed.

When the routine shown in FIG. 8 starts, first, at the step 400, it is judged if a post fuel injection flag Fpo is set (Fpo=1). The post fuel injection flag Fpo is set when the post fuel injection mode is selected and is reset when the selection of the post fuel injection mode is cancelled. When it is judged that Fpo=1 at the step 400, the routine proceeds to the step 401. On the other hand, when it is judged that Fpo=0, the routine is terminated directly.

When it is judged that Fpo=1 and then, the routine proceeds to the step 401, the catalyst temperature Tcat is detected. Next, at the step 402, it is judged if the catalyst temperature detected at the step 401 (i.e. the detected catalyst temperature) is higher than the base catalyst temperature Tcatst (Tcat>Tcatst). In this regard, when it is judged that Tcat>Tcatst (i.e. when the actual fuel injection amount is larger than the required fuel injection amount at the post fuel injection and therefore, the catalyst temperature is higher than the base catalyst temperature), the routine proceeds to the step 403. On the other hand, when it is judged that Tcat≤Tcatst, the routine is terminated directly.

When it is judged that Tcat>Tcatst and then, the routine proceeds to the step 403, the increment Δ Qi of the fuel injection amount is calculated on the basis of the difference between the catalyst temperature Tcat detected at the step 401 and the base catalyst temperature Tcatst (i.e. the catalyst temperature difference). Next, at the step 404, the deposit amount Xd is calculated from the map shown in FIG. 3 on the basis of the increment Δ Qi of the fuel injection amount calculated at the step 403 and then, the routine is terminated.

It should be noted that in the above-explained embodiments, the deposit amount is estimated only in relation to the minute fuel injection. However, in addition to this, the deposit amount may be estimated in relation to the fuel injection other than the minute fuel injection (i.e. the fuel injection for injecting the fuel of an amount such that the actual fuel injection amount is larger than the required fuel injection amount when there is the deposit on the injection hole wall face, for example, the main fuel for injecting the fuel of the relatively large amount). Next, the estimation of the deposit amount of this embodiment (hereinafter, will be referred to as—fifth embodiment—) will be explained.

In the fifth embodiment, for example, torques produced by the combustion of the fuel injected by the main fuel injection when the actual fuel injection amount at the main fuel injection wherein the required fuel injection amount is larger than a predetermined amount (i.e. the fuel injection amount such that the actual fuel injection amount is smaller than the required fuel injection amount when there is the deposit on the injection hole wall face) are previously obtained by the experiment, etc. and then, the obtained torques are stored in the electronic control unit as base torques. Then, the torque produced by the combustion of the fuel injected by the main fuel injection at the performance of the main fuel injection is detected (hereinafter, this torque will be referred to as—detected torque—). Then, it is judged if the detected torque is smaller than the base torque. In this regard, when it is judged that the detected torque is smaller than the base torque, the actual fuel injection amount at the main fuel injection is smaller than the required fuel injection amount. Then, the fuel of the relatively large amount is injected from the fuel injector at the main fuel injection and therefore, when the actual fuel injection amount is smaller than the required fuel injection amount, there is the deposit on the injection hole wall face. Therefore, in the fifth embodiment, when the detected torque at the performance of the main fuel injection is smaller than the base torque, it is judged that there is the deposit on the injection hole wall face.

Then, in the fifth embodiment, when it is judged that there is the deposit on the injection hole wall face (when the detected torque at the performance of the main fuel injection is smaller than the detected torque), the difference between the base and detected torques is calculated as the torque difference by subtracting the detected torque from the base torque. Then, the difference between the actual and required fuel injection amounts (this difference corresponds to the value obtained by subtracting the actual fuel injection amount from the required fuel injection amount and hereinafter, this will be referred to as—decrement of the fuel injection amount) is calculated on the calculated torque difference. It should be noted that the thus calculated decrement of the fuel injection amount is large as the torque difference is large.

Figure 9:
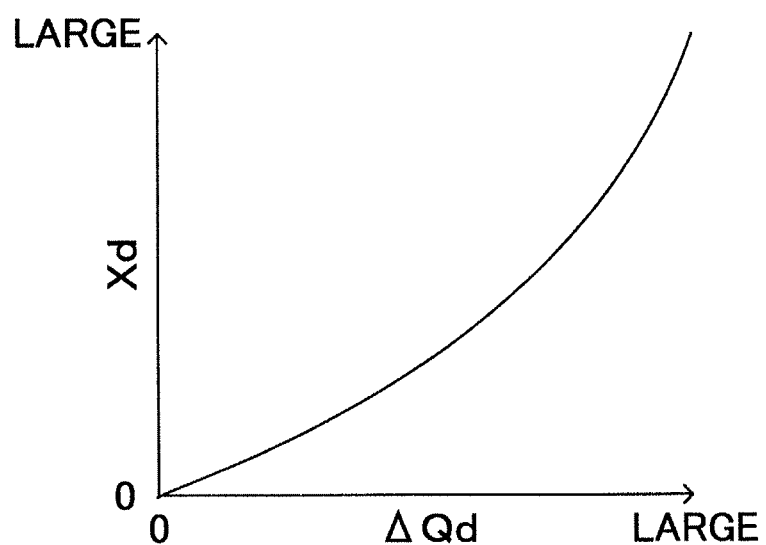
FIG. 9 is a view showing a map used to obtain the deposit amount Xd on the basis of a decrement $\Delta$ Qd of the fuel injection amount.

Then, the deposit amounts, each of which corresponds to the decrement of the fuel injection amount when the actual fuel injection amount is smaller than the required fuel injection amount at the performance of the main fuel injection, are previously obtained by the experiment, etc. and then, as shown in FIG. 9, the obtained deposit amounts Xd are stored in the electronic control unit in the form of a map as a function of the decrement ΔQd of the fuel injection amount. Then, the deposit amount Xd is calculated from the map shown in FIG. 9 on the basis of the decrement Δ Qd of the fuel injection amount calculated at the performance of the main fuel injection. It should be noted that the thus calculated deposit amount Xd is large as the decrement Δ Qd is large.

Figure 10:
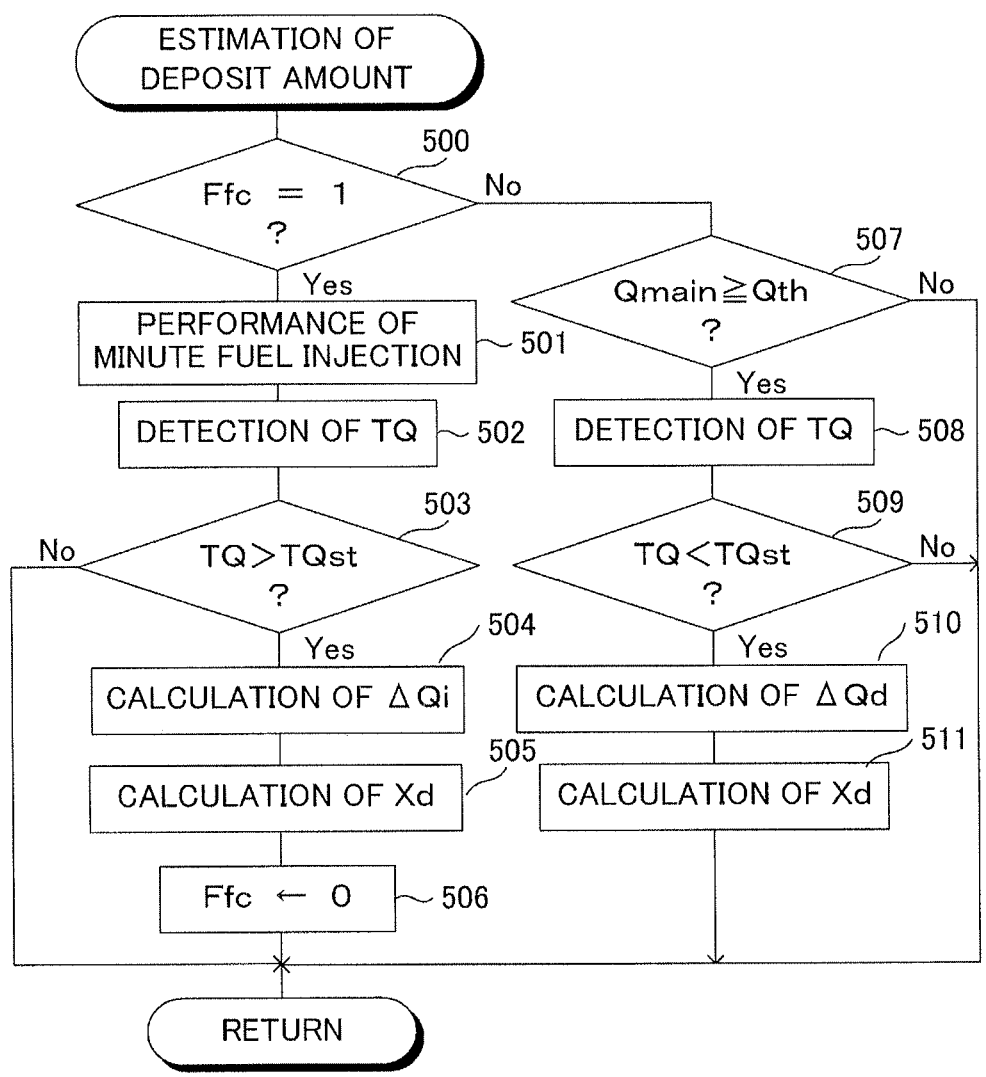
FIG. 10 is a view showing an example of a routine for performing the estimation of the deposit amount of the fifth embodiment.

Next, an example of the routine for performing the estimation of the deposit amount of the fifth embodiment will be explained. This routine is shown in FIG. 10. The routine shown in FIG. 10 is performed every a predetermined time period is elapsed. Further, the steps 501-506 of the routine shown in FIG. 10 are the same as the steps 101-106 of the routine shown in FIG. 4 and therefore, the explanation of these steps will be omitted.

When the routine shown in FIG. 10 starts, first, at the step 500, it is judged if a fuel cut flag Ffc is set (Ffc=1). The fuel cut flag Ffc is set when the fuel cut starts and is reset when the deposit amount is calculated at the step 505 of the routine shown in FIG. 10. When it is judged that Ffc=1 at the step 500, the routine proceeds to the step 501. On the other hand, when it is judged that Ffc=0, the routine proceeds to the step 507.

When it is judged that Ffc=0 at the step 500 and then, the routine proceeds to the step 507, it is judged if the amount Qmain of the main fuel (i.e. the amount of the fuel injected from the fuel injector by the main fuel injection) is larger than or equal to a predetermined amount Qth (Qmain≥Qth). In this regard, when it is judged that Qmain Qth, the routine proceeds to the step 508. On the other hand, when it is judged that Qmain<Qth, the routine is terminated directly.

When it is judged that Qmain≥Qth and then, the routine proceeds to the step 508, the torque TQ is detected. Next, at the step 509, it is judged if the torque TQ detected at the step 508 (i.e. the detected torque) is smaller than the base torque TQst at the performance of the main fuel injection (TQ<TQst). In this regard, when it is judged that TQ<TQst (i.e. when the actual fuel injection amount is smaller than the required fuel injection amount and therefore, a torque smaller than the base torque is produced), the routine proceeds to the step 510. On the other hand, when it is judged that TQ≥TQst, the routine is terminated directly.

When it is judged that TQ<TQst at the step 509 and then, the routine proceeds to the step 510, the decrement ΔQd of the fuel injection amount is calculated on the basis of the difference between the torque TQ detected at the step 508 and the base torque TQst at the performance of the main fuel injection. Next, at the step 511, the deposit amount Xd is calculated from the map shown in FIG. 9 on the basis of the decrement ΔQd of the fuel injection amount calculated at the step 510.

The invention claimed is:

1. A deposit amount estimation device of an internal combustion engine comprising:
a fuel injector having a first wall face defining a fuel injection hole of said fuel injector, a second wall face of said fuel injector adjacent to an inlet of said fuel injection hole other than said first wall face and a third wall face of said fuel injector adjacent to an outlet of said fuel injection hole other than said first wall face;
a first injection performing part for performing a first injection for injecting a fuel from said injector, a required fuel injection amount of said first injection being larger than or equal to a predetermined amount; and
a second injection performing part for performing a second injection for injecting the fuel from said injector, a required fuel injection amount of said second injection being smaller than said predetermined amount,
wherein the device comprises:
an estimation part for estimating a deposit amount which is an amount of a deposit on at least one of said first to third wall faces on the basis of an injection amount difference which is a difference between an actual fuel injection amount of said second injection and said required fuel injection amount of said second injection when said actual fuel injection amount of said second injection is larger than said required fuel injection amount of said second injection.

2. The deposit amount estimation device as set forth in claim 1, wherein said first injection is performed at a timing so as to produce a torque,
wherein said engine comprises:
a fuel-cut control performing part for performing a fuel-cut control for forbidding said first injection during a plurality of the operation cycles of said engine,
wherein said second injection is performed at a timing so as to produce a torque when said fuel-cut control is performed, and
wherein said estimation part estimates said deposit amount by using a difference between a base torque and an actual torque produced by said second injection as said injection amount difference, said base torque being a torque produced when said actual fuel injection amount of said second injection corresponds to said required fuel injection amount of said second injection.

3. The deposit amount estimation device as set forth in the claim 1, wherein said first injection is performed at a timing so as to produce a torque,
wherein said engine further comprises:
a fuel-cut performing part for performing a fuel-cut control for forbidding said first injection during a plurality of the operation cycles of said engine,
wherein said second injection is performed at a timing so as to produce a torque when said fuel-cut control is performed, and
wherein said estimation part comprises:
a judgment part for judging that said actual fuel injection amount of said second injection is larger than said required fuel injection amount of said second injection in the case that an actual torque produced by said second injection is larger than a base torque, said base torque being a torque produced when said actual fuel injection amount of said second injection corresponds to said required fuel injection amount of said second injection.

4. The deposit amount estimation device as set forth in the claim 1, wherein said first injection is performed at a timing so as to produce a torque,
wherein said engine further comprises:
a fuel-cut control performing part for performing a fuel-cut control for forbidding said first injection during a plurality of the operation cycles of said engine; and
a learning part for learning an amendment value for amending a fuel injection command value given to said injector such that said actual fuel injection amount of said second injection corresponds to said required fuel injection amount of said second injection on the basis of a difference between a base torque and an actual torque produced by said second injection, said base torque being a torque produced when said actual fuel injection amount of said second injection corresponds to said required fuel injection amount of said second injection,
wherein said second injection is performed at a timing so as to produce a torque when said fuel-cut control is performed; and
wherein said estimation part estimates said deposit amount by using said amendment value as said injection amount difference.

5. The deposit amount estimation device as set forth in the claim 1, wherein said first injection is performed at a timing so as to produce torque,
wherein said engine further comprises:
a fuel-cut control performing part for performing a fuel-cut control for forbidding said first injection during a plurality of the operation cycles of said engine; and
a learning part for learning an amendment value for amending a fuel injection command value given to said fuel injector such that said actual fuel injection amount of said second injection corresponds to said required fuel injection amount of said second injection on the basis of a difference between a base torque and an actual torque produced by said second injection, said base torque being a torque produced when said actual fuel injection amount of said injection corresponds to said required fuel injection amount of said second injection,
wherein said second injection is performed at a timing so as to produce a torque when said fuel-cut control is performed, and
wherein said estimation part comprises:
a judgment part for judging if said actual fuel injection amount of said second injection is larger than said required fuel injection amount of said second injection on the basis of said amendment value.

6. The deposit amount estimation device as set forth in the claim 1, wherein said fuel injector injects the fuel directly into a combustion chamber of said engine and, wherein said second injection is performed at a timing so as not to be able to produce a torque before said first injection.

7. The deposit amount estimation device as set forth in the claim 1, wherein said fuel injector injects the fuel directly into a combustion chamber of said engine and, wherein said second injection is performed at a timing so as not to be able to produce a torque after said first injection.

8. The deposit amount estimation device as set forth in the claim 1, wherein said estimation part estimates said deposit amount on the basis of an actual fuel injection amount of said first injection and said required fuel injection amount of said first injection when said actual fuel injection amount of said first injection is smaller than said required fuel injection amount of said first injection.

* * * * *